United States Patent
Acer et al.

[11] Patent Number: 6,151,359
[45] Date of Patent: *Nov. 21, 2000

[54] METHOD OF VIDEO BUFFER VERIFICATION

[75] Inventors: Michael Acer, Matawan; Nelson Botsford, III, Somerville; Michael Scheutzow, Parsippany, all of N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/920,691

[22] Filed: Aug. 29, 1997

Related U.S. Application Data

[63] Continuation of application No. 08/327,539, Oct. 21, 1994, abandoned.

[51] Int. Cl.[7] ..................................................... H04N 7/18
[52] U.S. Cl. ........................... 375/240; 348/419; 348/423; 348/845.1; 348/845.2; 348/845.3; 348/465
[58] Field of Search ..................................... 348/405, 406, 348/404, 384, 419, 845.1, 845.2, 845.3, 584, 469, 432, 473, 497, 485, 415

[56] References Cited

U.S. PATENT DOCUMENTS

| | | | |
|---|---|---|---|
| 5,159,447 | 10/1992 | Haskell et al. | 348/419 |
| 5,349,383 | 9/1994 | Parke et al. | 348/412 |
| 5,351,085 | 9/1994 | Coelho et al. | 348/415 |
| 5,386,232 | 1/1995 | Golin et al. | 348/416 |
| 5,418,571 | 5/1995 | Ghanbari | 348/419 |
| 5,515,107 | 5/1996 | Chiang et al. | 348/473 |
| 5,534,944 | 7/1996 | Egawa et al. | 348/473 |
| 5,652,627 | 7/1997 | Allen | 348/497 |

*Primary Examiner*—Andy Rao

[57] ABSTRACT

A method is provided for synchronizing video data buffers in a system including: an encoder for encoding input data into a compressed data bitstream; an encoder buffer for storing the compressed data bitstream; a decoder buffer for receiving the compressed data bitstream, with a sum of an encoder buffer delay and a decoder buffer delay is constant; a variable rate transmission channel operatively connecting the encoder buffer and the decoder buffer; and a decoder for receiving and decoding the compressed data bitstream. The instantaneous encoder buffer delay is used to generate a control signal; the control signal is inserted into the compressed data bitstream following the encoder buffer. In an exemplary embodiment, each of the encoder and decoder performs encoding and decoding operations, respectively, in the Motion Picture Experts Group (MPEG) standard, using the VBV_DLY parameter of the MPEG standard as the control signal.

16 Claims, 2 Drawing Sheets

METHOD OF VIDEO BUFFER VERIFICATION

This application is a continuation-in-part continuation division of application Ser. No. 08/327,539, filed on Oct. 21, 1994, now abandoned.

BACKGROUND OF THE INVENTION

1. Field of the Invention

This disclosure relates to video data buffers and, in particular, to a system and method for variable bit rate transmission using video data buffers.

2. Description of the Related Art

Video compression systems operating with constant bit rate encoding may implement the Motion Picture Experts Group (MPEG) standard of the International Standards Organization (ISO), as described in the MPEG standard specification; i.e. MPEG Test Model 4, "Coded Representation of Picture and Audio Information", ISO-IEC/JTC1/SC29/EG11, CCITT SG XV, Working Party XV/1, Document AVC-445b, February 1993. The MPEG standard specifies a Video Buffer Verifier (VBV) buffer as a model for a video decoder buffer. The system uses a Video_Buffer_Verifier Delay (VBV_DLY) parameter inserted into the compressed video bitstream transmitted from the encoder to the decoder to synchronize the video encoder and decoder buffers. The parameter VBV_DLY generated by the encoder is a measure of the time required to fill the decoder buffer from an empty state to an appropriate buffer level before the decoder is to remove the video data from the decoder buffer. The MPEG standard provides a method of calculating the VBV_DLY parameter as a function of the encoder buffer level and the constant bit rate R of the transmission channel. The VBV_DLY is calculated and inserted into the compressed video bitstream before it is sent to the encoder buffer for transmission to the decoder. Such compressed video bitstreams are produced by the encoder in such a manner as not to cause underflow or overflow in the decoder buffer.

For variable bit rate systems, the dependency of the system upon a transmission channel with a predetermined bit rate may be removed, while providing for proper video decoding without overflow or underflow. For such systems the MPEG standard does not specify a method to calculate the VBV_DLY parameter. In such systems, buffer synchronization is performed in another manner.

SUMMARY

A system and method is provided for synchronizing video data buffers using the VBV_DLY parameter in a system utilizing a variable rate transmission channel.

BRIEF DESCRIPTION OF THE DRAWINGS

The features of the disclosed variable bit rate transmission system and method will become more readily apparent and may be better understood by referring to the following detailed description of an illustrative embodiment of the present invention taken in conjunction with the accompanying drawings, where.

DESCRIPTION OF THE PREFERRED EMBODIMENTS

Figure 1:
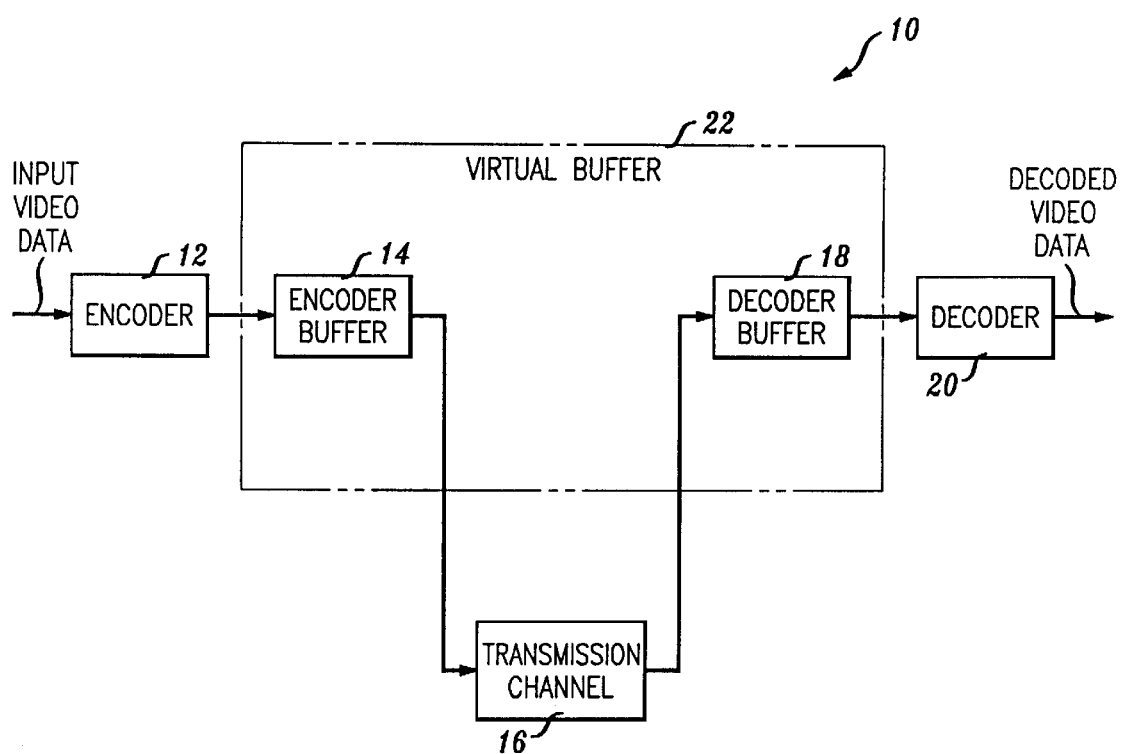
FIG. 1 illustrates a block diagram of the disclosed variable bit rate transmission system.

Referring now in specific detail to the drawings, with like reference numerals identifying similar or identical elements, as shown in FIG. 1, the present disclosure relates to a variable bit rate transmission system and method which models the buffers associated with an encoder and a decoder as a single virtual buffer.

As shown in FIG. 1, the variable bit rate transmission system 10 includes an encoder 12 for encoding input data such as video data to a compressed data bitstream, and an encoder buffer 14 operatively associated with the encoder 12 for receiving the encoded input data to be transmitted over the transmission channel 16. A decoder buffer 18 receives the transmitted bitstream for processing by the decoder 20 to retrieve the transmitted data. The encoder buffer 14 and the decoder buffer 18 are associated with a virtual buffer 22.

The video encoder 12 may be implemented in a manner known in the art, as described, for example, in U.S. Pat. Nos. 5,144,423 to Knauer et al.; 5,231,484 to Gonzales at al.; 5,247,363 to Sun et al.; 5,293,229 to Iu; and 5,325,125 to Naimpally et al., each of which are incorporated herein by reference.

In the exemplary variable bit rate transmission system and method, the decoder 20 includes means for decoding as well as means for extracting control signals, as known in the art. In particular, for an MPEG-specific variable bit rate transmission system, the encoder 12 and decoder 20 are MPEG encoders and decoders, respectively, which are well known in the art.

Referring again to FIG. 1, in the exemplary embodiment, the encoder buffer 14 and the decoder buffer 18 act as a virtual buffer 22. The encoder buffer 14 is associated with an encoder buffer delay $D_E$, and the decoder buffer 18 is associated with a decoder buffer delay $D_D$. Each of the delays $D_E$, $D_D$, represents the time required for data to be processed and/or passed through the encoder buffer 14 and the decoder buffer 18, respectively. In the exemplary embodiment, the nominal delay through the transmission channel 16 is considered to be a constant.

The total buffer delay $D_B$ must be constant for proper operation of the decoder 20. With a constant instantaneous total buffer delay $D_B$, the encoder 12 may then provide variable rate encoding of the input data with an "elastic" encoder buffer 14 and decoder buffer 18, such that the decoder buffer delay $D_D$ depends on the encoder buffer delay $D_E$ with $D_B=D_E+D_D$. Therefore, $D_D=D_B-D_E$.

In the exemplary embodiment, the encoder 12 generates the variable rate video data. The VBV_DLY is calculated periodically and inserted into the compressed video bitstream following the encoder buffer 14. The VBV_DLY is calculated by measuring the instantaneous delay $D_E$ which the data exiting the encoder buffer 14 has experienced, and this delay is subtracted from total buffer delay $D_B$. For this embodiment, the units of VBV_DLY are counts of a 90 KHZ clock.

Figure 2:
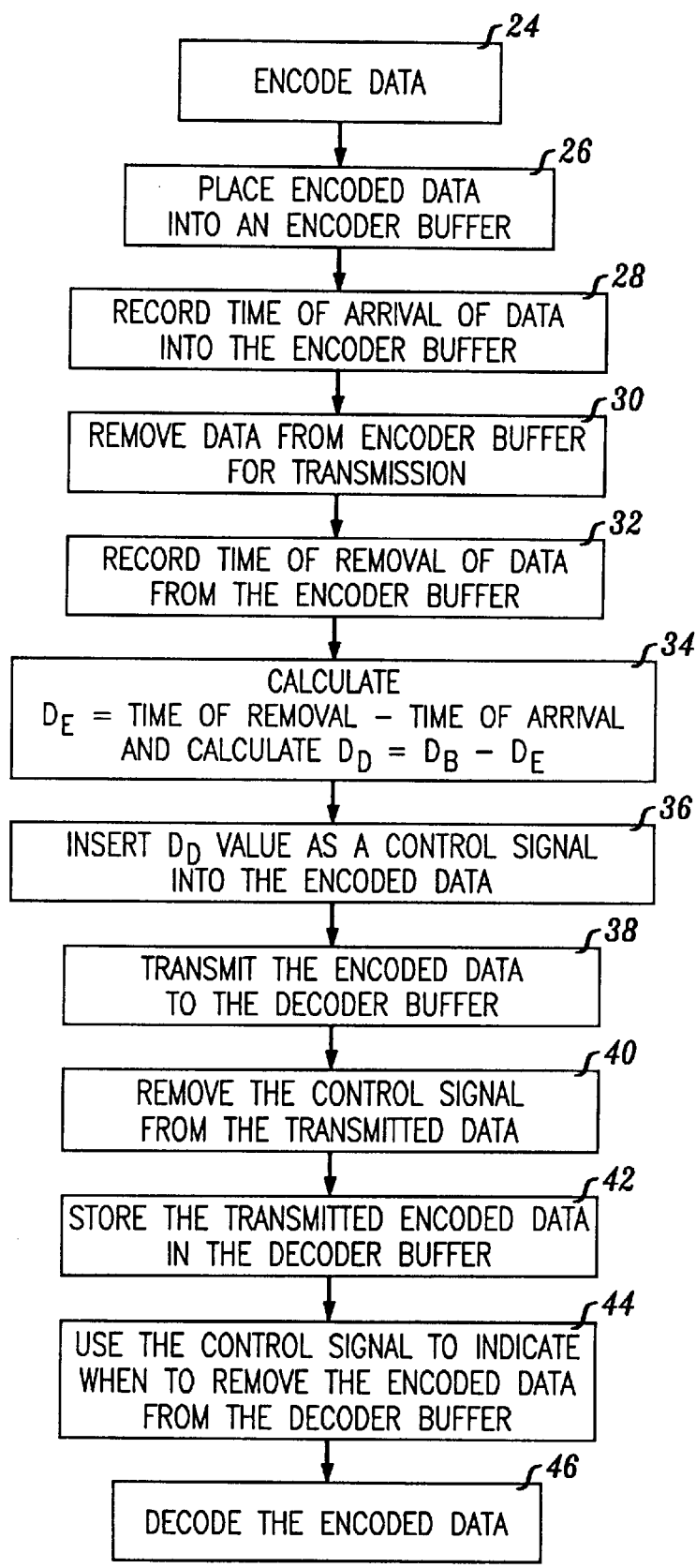
FIG. 2 is a flow chart of the method and operation of the disclosed variable bit rate transmission system.

As shown in FIG. 2, the disclosed synchronization method operates according to the following steps: encode input data using the encoder 12 into a compressed data bitstream in step 24; transfer the compressed data to the encoder buffer 14 in step 26; record the time of arrival at the encoder buffer 14 in step 28; remove data from the encoder buffer 14 for transmission in step 30; record the time of removal of data from the encoder buffer 14 in step 32; calculate $D_E$=time of removal—time of arrival and calculate $D_D=D_B-D_E$ in step 34; insert the $D_D$ value as a control signal into the encoded data in step 36; transmit the encoded data to the decoder buffer 18 in step 38; remove the control signal from the transmitted data in step 40; store the transmitted encoded data in the decoder buffer 18 in step 42; use the control signal to indicate when to remove the encoded data from the decoder buffer 18 in step 44; and decode the encoded data in step 46.

While the disclosed synchronization method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A system for synchronizing data buffers using a variable rate transmission channel, the system comprising:

an encoder buffer;

an encoder for periodically generating a synchronization control signal from an instantaneous value of a delay of data passing through the encoder buffer, said instantaneous value of a delay being substantially equal to a difference between the time of removal of said data from said encoder buffer and the time of arrival of said data to said encoder buffer and said synchronization control signal including at least a parameter calculated periodically and being substantially equal to a constant minus said difference, and for encoding input data and the synchronization control signal into a compressed data bitstream;

a decoder buffer synchronized with the encoder buffer using the synchronization control signal;

a variable rate transmission channel operatively connecting the encoder buffer and the decoder buffer for providing transmission from the encoder buffer and reception to the decoder buffer of the compressed data bitstream and the synchronization control signal, based on the instantaneous value of a delay of data passing through the encoder buffer; and a decoder for receiving and decoding the compressed data bitstream and the synchronization control signal and for extracting from the synchronization control signal an instantaneous decoder delay value to establish synchronization, wherein the parameter is substantially equal to the instantaneous decoder delay value, and wherein said instantaneous decoder delay value is determined based on an instantaneous arrival time at said encoder buffer and an instantaneous removal time from said encoder buffer of said data encoded within said compressed data bitstream to arrive at said encoder buffer and to be removed from said encoder buffer, and wherein said instantaneous decoder delay value is determined before said data bitstream is transmitted to said decoder buffer, such that said instantaneous decoder delay value is encoded within the synchronization control signal and indicates, prior to arrival of said encoded data at said decoder, when said data is to be removed from said decoder buffer.

2. The system of claim 1 wherein the encoder determines the instantaneous value of the encoder delay of the encoder buffer for generating the synchronization control signal therefrom for controlling the synchronization of the encoder and decoder buffers.

3. The system of claim 1 wherein the encoder inserts the synchronization control signal into the compressed data bitstream subsequent to the encoder buffer.

4. The system of claim 2 wherein each of the encoder and decoder performs encoding and decoding operations, respectively, using a VBV_DLY parameter in the Motion Picture Experts Group (MPEG) standard; and the encoder implements the synchronization control signal as the VBV_DLY parameter.

5. A Motion Picture Experts Group (MPEG) video transmission system comprising:

a MPEG encoder for encoding input data as a compressed data bitstream, for generating a parameter from an instantaneous encoder delay of data passing through an encoder buffer for insertion into the compressed data bitstream, and for providing variable bit rates for outputting the compressed data bitstream, the parameter being computed as a constant minus the instantaneous encoder delay of data passing through the encoder buffer and being substantially equal to a decoder delay;

the encoder buffer having the instantaneous encoder delay of data passing therethrough for transmitting the compressed data bitstream from the MPEG encoder over a variable rate transmission channel operatively connected to the encoder buffer;

a decoder buffer operatively connected to the encoder buffer by the variable rate transmission channel for receiving the compressed data bitstream, the decoder having the decoder delay wherein a sum of the encoder delay and the decoder delay is constant; and a MPEG decoder for receiving the compressed data bitstream from the decoder buffer over the variable rate transmission channel, for extracting the parameter therefrom associated with the encoder delay of data passing through the encoder, for decoding the compressed data bitstream, for using the parameter to periodically obtain the decoder delay, and for using at least the decoder delay to synchronize the encoder buffer and decoder buffer; wherein the decoder delay is determined based on an instantaneous arrival time at said encoder buffer and an instantaneous removal time from said encoder buffer of said data encoded within said compressed data bitstream to arrive at said encoder buffer and to be removed from said encoder buffer.

6. A method for transmitting data at variable rates comprising the steps of:

determining an instantaneous encoder buffer delay of data passing through an encoder buffer, said instantaneous encoder buffer delay being substantially equal to a difference between the time of removal of said data from said encoder buffer and the time of arrival of said data to said encoder buffer;

generating a synchronization control signal from the instantaneous encoder buffer delay of data passing through the encoder buffer using the encoder, the synchronization control signal including a decoder buffer delay determined as a constant minus the value of the instantaneous encoder buffer delay;

encoding input data using the encoder to provide a compressed data bitstream, including the synchronization control signal;

transmitting the compressed data bitstream, including the synchronization control signal to a decoder buffer over a variable rate transmission channel operatively connected to the encoder buffer and the decoder buffer using a variable rate;

receiving, by the decoder buffer, the compressed data bitstream, including the synchronization control signal;

removing and decoding the compressed data bitstream, including the decoder buffer delay from the synchronization control signal, from the decoder buffer; and synchronizing the encoder and decoder buffers using at least the decoder buffer delay, whereby the sum of the encoder buffer delay and the decoder buffer delay is a constant, wherein said decoder buffer delay is determined based on an instantaneous arrival time at said encoder buffer and an instantaneous removal time from said encoder buffer of said data encoded within said compressed data bitstream to arrive at said encoder buffer and to be removed from said encoder buffer.

7. The method of claim 6 wherein the step of encoding includes the step of:

inserting the synchronization control signal into the compressed data bitstream; and wherein the step of decoding includes the steps of:

extracting the synchronization control signal from the compressed data bitstream;

synchronizing the encoder and decoder buffers using the synchronization control signal; and decoding the compressed data bitstream using the synchronization control signal.

8. The method of claim 7 wherein the step of inserting includes the step of inserting the synchronization control signal into the compressed data bitstream subsequent to the encoder buffer.

9. The method of claim 8 wherein each of the steps of encoding and decoding perform the encoding and decoding, respectively, according to the Motion Picture Experts Group (MPEG) standard; and the step of generating the synchronization control signal includes the step of generating a VBV_DLY parameter as the synchronization control signal.

10. A system for encoding input data, the system comprising:

an encoder for generating a synchronization control signal generated from an instantaneous delay of data passing through an encoder buffer, and for encoding input data, the synchronization control signal including a decoder delay determined as a constant minus the value of the instantaneous encoder buffer delay, the synchronization signal being inserted into a compressed data bitstream, wherein the encoder buffer is operatively connected to a second buffer having said decoder delay by a variable rate transmission channel, the encoder buffer and the second buffer together having a constant delay time and are synchronized using the synchronization control signal; and means for transmitting the compressed data bitstream, including the synchronization signal at a variable rate over the variable rate transmission channel for use of at least said decoder delay by a decoder to synchronize the encoder and the decoder, wherein the decoder delay of said second buffer is determined based on said instantaneous encoder buffer delay of data passing through said encoder buffer.

11. The system of claim 10 wherein the constant delay time is a delay time of propagation of the compressed data bitstream through both the encoder buffer and the second buffer.

12. The system of claim 10 wherein the encoder determines the instantaneous delay of the encoder buffer and generates the synchronization control signal from the instantaneous delay to be transmitted in the compressed data bitstream for synchronizing the encoder buffer and the second buffer.

13. The system of claim 12 wherein the encoder performs encoding operations using the instantaneous delay and a VBV_DLY parameter in the Motion Picture Experts Group (MPEG) standard; and the encoder implements the synchronization control signal as the VBV_DLY parameter.

14. A method for transmitting data at variable rates comprising the steps of:

encoding input data using an encoder to a compressed data bitstream;

periodically determining an instantaneous delay time for a specified portion of the compressed data bitstream to propagate through an encoder buffer;

inserting a buffer synchronization parameter into the compressed data bitstream, wherein the buffer synchronization parameter is determined as a constant minus the instantaneous delay time of the specified portion to propagate through the encoder buffer;

transmitting the compressed data bitstream, including the buffer synchronization parameter, from the encoder buffer at a variable rate over a variable rate transmission channel operatively connected to the encoder buffer which is synchronized with a second buffer using the buffer synchronization parameter;

extracting, at a decoder, the synchronization parameter; and synchronizing the encoder buffer with the second buffer using the buffer synchronization parameter by removing encoded data from said second buffer at a rate equal to the constant minus the instantaneous delay time for the specified portion to propagate through the encoder buffer, said rate being substantially equal to a delay of the second buffer, wherein said rate is determined based on an instantaneous arrival time at said encoder buffer and an instantaneous removal time from said encoder buffer of said specified portion of said compressed data bitstream to arrive at said encoder buffer and to be removed from said encoder buffer.

15. The method of claim 14 wherein the step of inserting includes the step of inserting the buffer synchronization parameter into the compressed data bitstream subsequent to the encoder buffer.

16. The method of claim 14 further including the step of:

generating a VBV_DLY parameter as the inserted buffer synchronization parameter; and the step of encoding includes performing the encoding according to the Motion Picture Experts Group (MPEG) standard.

* * * * *